Nov. 1, 1955   L. H. D. M. BALLU   2,722,280
ADJUSTABLE ENDLESS TRACK VEHICLE
Filed Dec. 11, 1951   3 Sheets-Sheet 1

Inventor
Louis H. D. M. Ballu
by
Stevens, Davis, Miller & Mosher
his attorneys

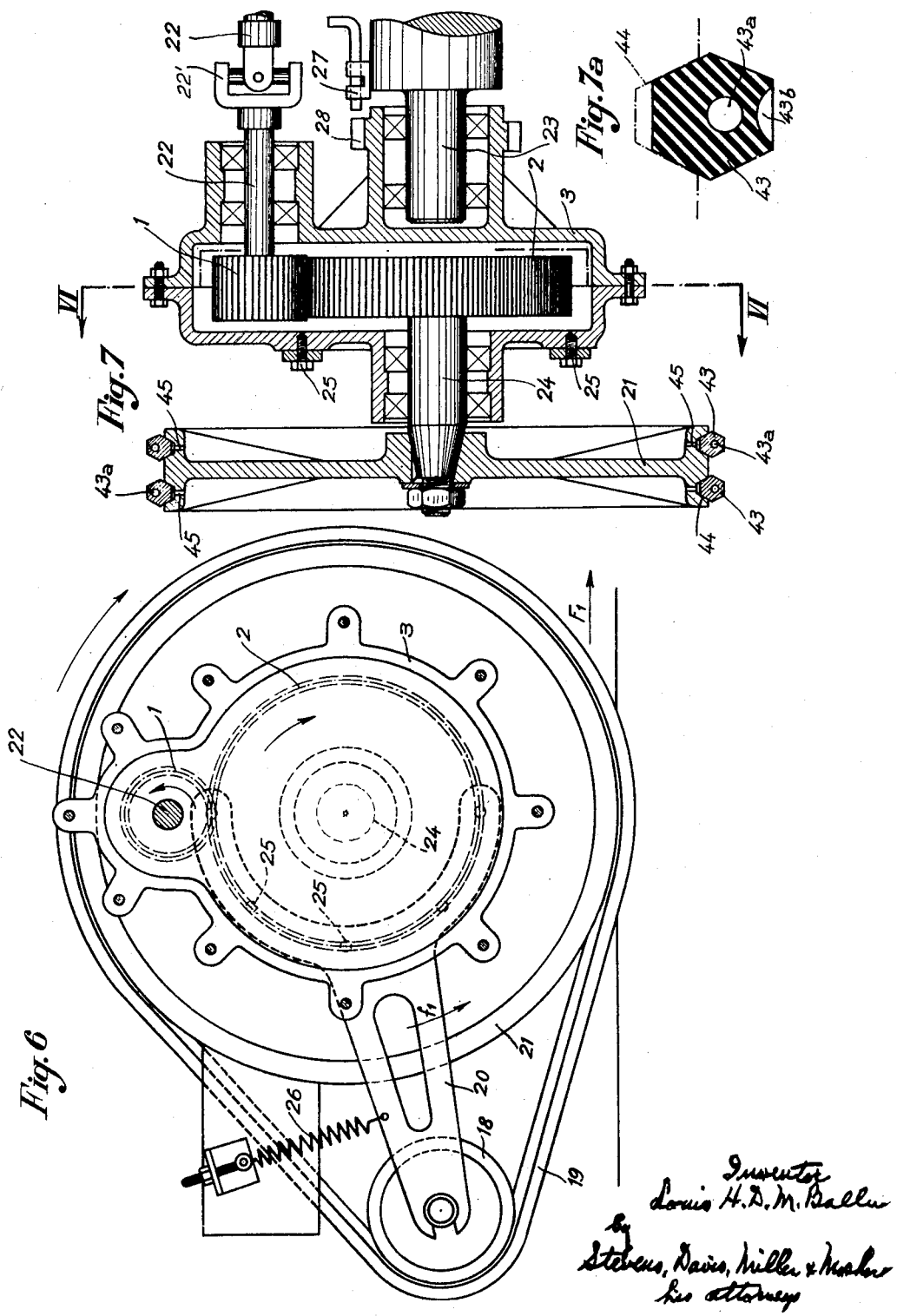

Nov. 1, 1955 L. H. D. M. BALLU 2,722,280
ADJUSTABLE ENDLESS TRACK VEHICLE
Filed Dec. 11, 1951 3 Sheets-Sheet 3
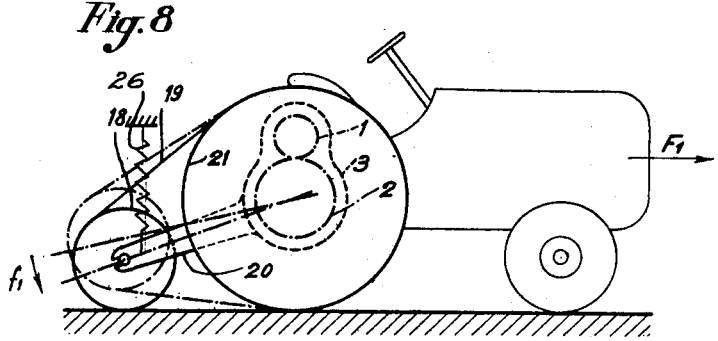
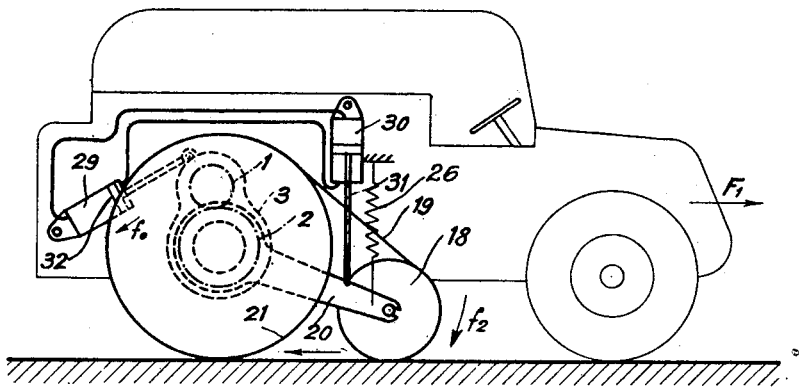
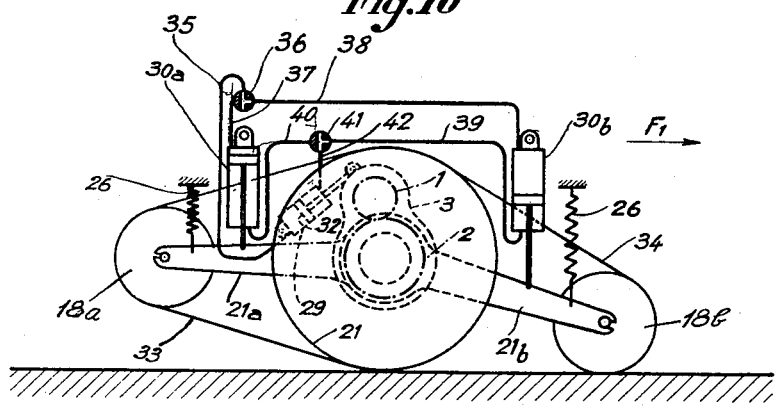

United States Patent Office 2,722,280
Patented Nov. 1, 1955

2,722,280
ADJUSTABLE ENDLESS TRACK VEHICLE
Louis H. D. M. Ballu, Epernay, France Application December 11, 1951, Serial No. 261,110

Claims priority, application France December 13, 1950

6 Claims. (Cl. 180—9.1)

In certain types of transmission gears in which the driving and driven members rotate in a casing adapted to pivot about an axis, this casing effects an angular displacement in the opposite direction to the resistant couple.

An object of the present invention is to use the angular displacements of the casing for automatically controlling, in relation with the magnitude of the resistant couple, various members or devices such as devices for utilising, regulating, indicating or limiting couples.

A further object of this invention is to apply such transmission gears for automatically controlling, in operation, the impact variation on the soil of vehicle endless tracks, for the purpose of altering the adhesion thereof according to the resistance against forward motion due to the soil on which the said vehicle moves.

Other objects and advantages of the invention will be apparent during the course of the following description.

Figure 1:
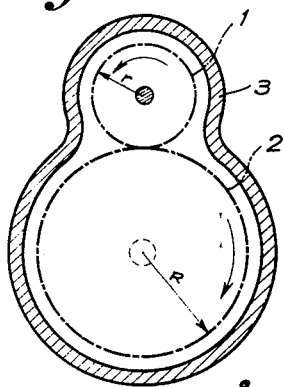
Figure 2:
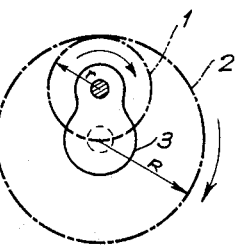
Figure 3:
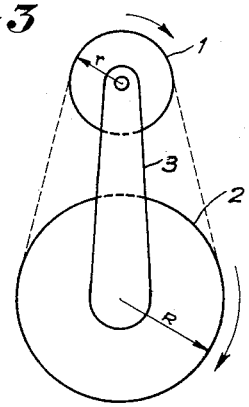
Figure 4:
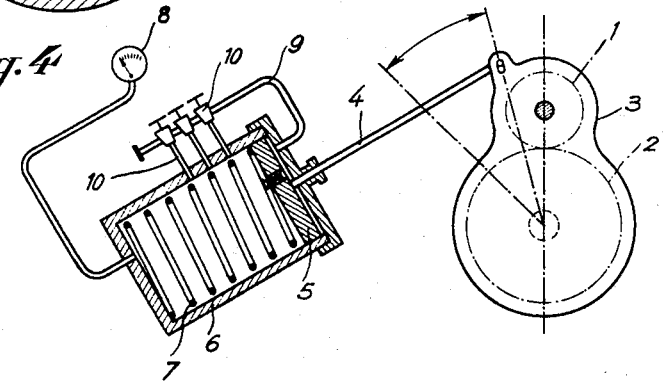
Figure 5:
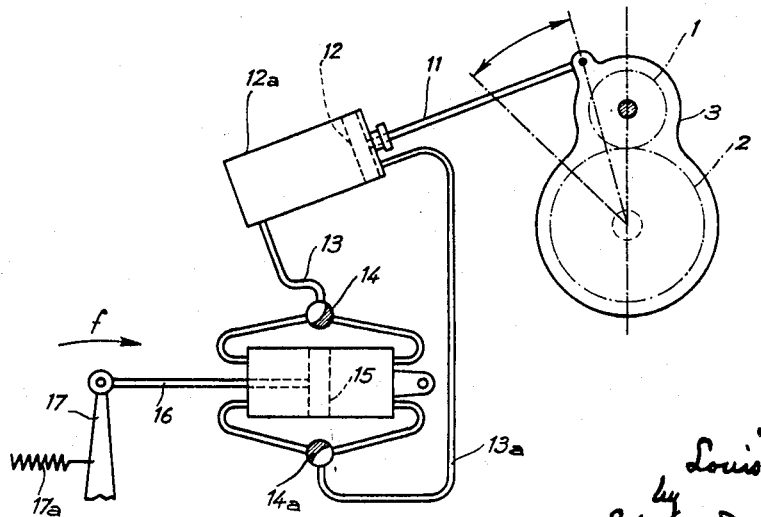

In the accompanying drawing in which like reference characters are employed to designate like parts throughout the same, Figs. 1, 2 and 3 are diagrammatic views illustrating the principle of the invention, Fig. 4 shows an application of this principle to the control of a hydraulically-operated dynamometer, Fig. 5 concerns the control of a servo-motor, Fig. 6 which relates to the control of the endless track of a tractor, is a section taken along line VI—VI of Fig. 7, Fig. 7 is an axial section of the control device shown in Fig. 6, Fig. 7a shows, on an enlarged scale, the cross-section of a bi-trapezoidal belt used for the endless track, Fig. 8 diagrammatically shows a tractor provided with variable impact endless tracks controlled by means of a gear according to the invention, Fig. 9 concerns a vehicle provided with variable impact endless tracks, Fig. 10 is a detail view relating to a double-acting device.

Fig. 1 shows an epicyclic gear train comprising a driving pinion 1 and a driven pinion 2, $r$ and $R$ being the respective primitive radii. The driving pinion 1 rotates in a casing 3 which can itself pivot about the axis of the driven pinion 2. The shaft driving the pinion 1 has a certain suppleness (as specified hereafter) allowing angular displacements of the casing 3 about the axis of 2.

Let $C_1$ be the driving torque applied to the pinion 1, $C_2$ the resistant couple applied to the pinion 2, and $C_3$ the reaction couple which tends to rotate the casing 3 about the axis of 2. The system will be in equilibrium if $$C_1 + C_2 + C_3 = 0$$

This is obviouslly true for any type of epicyclic gear, whether "epicycloidal" as in Fig. 1 or "hypocycloidal" as in Fig. 2. It is also true in the case of a chain or belt drive as shown in Fig. 3.

Any of the devices described thus enable, by measuring the magnitude of the reaction couple $C_3$ applied to the casing 3, to determine either of the couples $C_1$ and $C_2$ when the other is known. For instance, in the case of a transmission with a known driving couple, it is easy to determine the value of the resistant couple.

The reaction couple can be measured by means of any dynamometer, but more conveniently of a hydraulically-operated dynamometer, such as the one shown in Fig. 4.

In this case, the casing 3 is linked, through a rod 4, to a piston 5 sliding in a cylinder 6 and urged by a return spring 7; the cylinder is connected to a properly graduated manometer 8. The cylinder 6 is conveniently provided with a damping device including a piping 9 with several nozzles 10 of adjustable output, communicating with the cylinder 6.

Such an apparatus is particularly designed for measuring tangential forces on wheels of vehicles in motion and can especially be adapted to agricultural tractors.

The reaction couple can be used for controlling a servo-motor and Fig. 5 diagrammatically shows such an embodiment.

The casing 3 is linked to the rod 11 of a piston 12 sliding in a cylinder 12a which is connected, through the piping 13, to a three-way cock 14 directing the driving fluid towards one or the other face of the piston 15 of the servo-motor. A further three-way cock 14a is fitted up on the return piping 13a and connects the chamber behind the piston 12 to the chamber of the servo-motor which is to be exhausted. The piston of the servo-motor is linked, through a rod 16, to a member 17 to be controlled, according to the position of the cocks 14 and 14a. In Fig. 5 it has been assumed that the member 17 is to be actuated, by the servo-motor, in the direction of arrow $f$ and urged in the opposite direction by means of a return spring 17a. The member 17 can be associated with any safety device, e. g. brake, circuit-breaker, disengaging gear, sound or luminous warning signal; it can furthermore automatically control various implements carried by the tractor.

As regards vehicles more particularly, there can be used, for example, as couple dampers, two or more apparatus such as the one shown in Fig. 4, independently associated with each propulsion member, with a view to protecting the whole transmission against detrimental impacts resulting from the operation of the vehicle.

The gear described above is particularly convenient for automatically controlling the variation in impact, on the soil, of vehicle endless tracks.

Indeed, as known, it is convenient, in the case of an endless track vehicle, to be able to adjust the bearing surface of the endless tracks in accordance with the strength of the soil. For this purpose, the present invention proposes to fit up the pulley 18 for tensioning the endless track 19 (Fig. 6), at the end of an arm 20 angularly movable about the axis of the driving or sprocket wheel 21. By lowering or raising the arm 20, it is possible to bring a variable length of endless track into contact with the ground.

The angular movement of the arm 20 of each endless track is controlled by a gear such as described above.

In the embodiment of Figs. 6 and 7, the epicyclic gear train comprises the driving pinion 1 and the driven one 2 located inside the casing 3.

The pinion 1 is connected to the driving motor (not illustrated) through a convenient transmission diagrammatically shown as including drive shafts 22 at either side of a flexible joint 22′ arranged to permit the left shaft 22 to follow the angular displacement of pinion 1 within casing 3. The casing 3 is journalled at 23 and it supports the shaft 24 at the end of which is mounted the sprocket-wheel 21. The end of the arm 20 is secured at 25 to the casing 3, and this arm is urged by a return spring 26 having a fixed point, for instance on a beam of the tractor.

As the pinions 1 and 2 rotate in the direction of the arrows in Figs. 1 and 6, and if the tractor moves in the direction of the arrow $F_1$, any increase in resistant couple will cause the arm 20 to swing in the direction of the arrow $f_1$ and, hence, to apply a greater length of endless track on the soil, thus increasing adhesion in accordance with the resistant couple.

A locking device diagrammatically shown at 27, allows, when engaged in stops 28 integral with the casing 3, to secure the arm 20 in any position, in case for instance the endless track breaks or the motion is reversed.

The gear described with reference to Figs. 6 and 7 can further be applied to vehicles comprising, instead of endless tracks 19, auxiliary wheels mounted at the ends of arms 20, in the place of the wheels 18, these auxiliary wheels being preferably driving wheels connected for this purpose, through an appropriate transmission, to the main wheels mounted in the place of the sprocket wheels 21.

The lateral adhesion in bends, of vehicles such as the one shown in Figs. 6 and 7, is reduced compared with that of known tractors with endless tracks or semi-endless tracks.

The action of a brake on the transmission of the inner endless track with respect to the direction of the bend, causes the driving torque to cancel and the resistant couple to change sign, thus automatically and instantaneously raising the considered endless track.

Referring to Fig. 8, a tractor is diagrammatically shown, which comprises an auxiliary adhesion device similar to that of Figs. 6 and 7 and in which the arm 20 supporting the counterwheel 18 is fixedly connected to the casing 3; this device can be lowered beyond the rear axle.

In the case of lorries as diagrammatically shown in Fig. 9, it will generally be more convenient to lower the auxiliary adhesion device between the rear and front axles, this device comprising, as above endless tracks 19, counter wheels 18 and sprocket wheels 21.

In this embodiment, the rotation of the arms 20 taking place in the direction of the arrow $f_2$, i. e. in the opposite direction to the arrow $f_1$ (Fig. 8), it is necessary to provide, between the casing 3 and the arm, a displacement reversing device; and conventional device can be used for this purpose: in Fig. 9, a hydraulic device is used which comprises a cylinder 29 the piston 32 of which is connected to the casing 3, this cylinder controlling a servo-motor 30 having a rod 31 linked to the arm 20.

Any angular displacement of the casing due to an increase in the resistant couple will cause displacement of the piston 32, in the direction of arrow $f_0$, and hence the lowering of the arm 20 and of the endless track 19, this arm being pivoted about a fixed axis which is conveniently that of the shaft 24 of each sprocket wheel.

It is further possible, according to the invention, to equip a vehicle with a double auxiliary adhesion system, one of the endless tracks 33 being directed towards the rear of the sprocket wheels, whereas the other endless track is directed towards the front thereof, as shown in Fig. 10.

By putting into operating position one or the other of these endless tracks, it is possible to give the vehicle either the advantages of a tractor or those of a lorry.

In the embodiment of Fig. 10, it has been assumed that the vehicle is a lorry. Therefore the endless track 34 is in operation, whereas the endless track 33 is held in raised position owing to its return spring 26.

The cylinder 29 is connected through the duct 35, to a three-way cock 36 controlling two pipings 37, 38 leading respectively to servo motors $30a$ and $30b$, the servomotor $30a$ being connected to the arm $21a$ of the endless track 33, whereas the servo-motor $30b$ is connected to the arm $21b$ of the endless track 34. The servo-motors are moreover connected, through ducts 39 and 40, to a three-way cock 41 associated with a duct 42 leading to the cylinder 29.

Under these conditions, when the casing 3 is subjected to a reaction couple, the piston 32 forces the driving fluid into the duct 35; the cocks 36 and 41 being previously conveniently set, the driving fluid acts on the servomotor $30b$ which adjusts the position of the corresponding auxiliary adhesion device including arm $21b$, counterwheel $18b$ and endless track 34.

The position of the cocks 36 and 41 being inverted, it is clear that, instead of acting on the arm $21b$, the displacements of the piston 32 will entail variations in the position of the arm $21a$, the arm $21b$ being held in raised position owing to the action of the corresponding spring 26.

It is further possible to act on the devices in order to achieve their simultaneous servo-control by the appropriate setting of the cocks.

Hence it can be understood that the application of the gear of the invention to the control of endless tracks of vehicles, allows of greatly increasing the efficiency of such vehicles.

This efficiency can be further improved by using endless tracks constituted, as shown in Figs. 7 and $7a$, by rubber belts 43 of bi-trapezoidal cross-section, the inner part of these belts cooperating with grooves 44 of trapezoidal cross-section, located on the sprocket wheels, whereas the outer part rests on the ground and tends to form trapezoidal tracks. Thus both sides of the belts are turned to account with the advantages related to trapezoidal belts. An inner recess $43a$ can be provided inside the belts and a hollow $43b$ on the smaller outer base of the trapezium. The grooves 44 of the sprocket wheels comprise protrusions promoting driving and have furthermore ports such as 45 evacuating mud carried along by the endless track, so that the bottom of the groove 44 keeps its initial outline, thus insuring proper drive of the endless tracks, contrarily to known arrangements in which mud collects at the bottom of the groove.

What I claim is:

1. In a vehicle provided with a driving shaft and an endless track cooperating with a sprocket wheel and a counter wheel respectively adapted to drive and to tension said endless track, a transmission gear comprising a driving pinion mechanically connected to said driving shaft, a driven pinion mechanically connected to said sprocket wheel and meshing with said driving pinion, a pivotally mounted casing freely carrying said pinions, a movable support freely carrying said counter wheel, connecting means between said casing and said support for bringing said support under control of said casing, and yieldable means to resist movement of said support.

2. In a vehicle provided with a driving shaft and an endless track cooperating with a sprocket wheel and a counter wheel respectively adapted to drive and to tension said endless track, a transmission gear comprising an epicyclic train including a pinion driven from said driving shaft and a pinion associated with said sprocket wheel, said pinions meshing with one another, a pivotally mounted casing freely carrying said pinions, a movable support freely carrying said counter wheel, connecting means between said casing and said support for bringing said support under control of said casing, and yieldable means to resist movement of said support.

3. In a vehicle provided with a driving shaft and an endless track cooperating with a sprocket wheel and a counter wheel respectively adapted to drive and to tension said endless track, a transmission gear comprising an epicyclic train including a pinion driven from said driving shaft and a pinion associated with said sprocket wheel, said pinions meshing with one another, a pivotally mounted casing freely carrying said pinions, the axis of rotation of said casing coinciding with the axis of rotation of said sprocket wheel, a support freely carrying said counter wheel and adapted to pivot about said axis, connecting means between said casing and said support for bringing said support under control of said casing, and yieldable means to resist movement of said support.

4. A transmission gear as claimed in claim 3, in which the support freely pivots about the casing and the connecting means includes a servomotor controlled from said casing and adapted to adjust the position of said support.

5. In a vehicle provided with a driving shaft and an endless track cooperating with a sprocket wheel and a counter wheel respectively adapted to drive and to tension said endless track, a transmission gear comprising an epicyclic train including a pinion driven from said driving shaft and a pinion associated with said sprocket wheel, said pinions meshing with one another, a pivotally mounted casing freely carrying said pinions, the axis of rotation of said casing coinciding with the axis of rotation of said sprocket wheel, a support freely carrying said counter wheel and adapted to pivot about said axis, means for fixedly connecting said casing and said support for bringing said support under control of said casing, and yieldable means to resist movement of said support.

6. A transmission gear as claimed in claim 3, in which the yieldable means upwardly urges the support.

References Cited in the file of this patent

UNITED STATES PATENTS

| | | |
|---|---|---|
| 1,142,169 | Houghton | June 8, 1915 |
| 1,964,779 | Ziegler | July 3, 1934 |
| 2,596,035 | Love | May 6, 1952 |